US006813985B2

(12) United States Patent
Gharst et al.

(10) Patent No.: US 6,813,985 B2
(45) Date of Patent: Nov. 9, 2004

(54) INSULATION CARRYING AND CUTTING DEVICE

(76) Inventors: Thomas Gharst, 388 Enterprise St., #103, San Marcos, CA (US) 92078; Jerry Cheek, Highway 12 East, P.O. Box 1395, Kosciusko, MS (US) 39090

(*) Notice: Subject to any disclaimer, the term of this patent is extended or adjusted under 35 U.S.C. 154(b) by 279 days.

(21) Appl. No.: 10/001,403

(22) Filed: Oct. 31, 2001

(65) Prior Publication Data

US 2003/0079596 A1 May 1, 2003

(51) Int. Cl.[7] .............................. B26D 3/06; B26D 7/00; B65H 16/02; B62B 1/00

(52) U.S. Cl. .............................. 83/863; 83/875; 83/886; 83/485; 83/614; 83/649; 83/949; 83/455; 242/557; 280/79.3

(58) Field of Search ................... 83/861–864, 875–876, 83/879–882, 884, 886, 887, 485, 436.3, 436.4, 614, 620, 665, 676, 52, 949, 56, 649, 31, 455, 749, 751; 242/557, 588, 403.1, 422.5, 596.1; 225/96; 250/79.2, 79.5, 79.3, 79.4

(56) References Cited

U.S. PATENT DOCUMENTS

| | | | | | |
|---|---|---|---|---|---|
| 266,708 | A | | 10/1882 | Jean | |
| 794,060 | A | * | 7/1905 | Uzel | 29/564 |
| 1,302,831 | A | * | 5/1919 | Naugler | 493/396 |
| 1,701,046 | A | | 2/1929 | Kraus | |
| 1,998,357 | A | * | 4/1935 | Carison | 83/864 |
| 2,598,992 | A | | 6/1952 | Gordon | |
| 2,656,050 | A | | 10/1953 | Best et al. | |
| 2,783,837 | A | * | 3/1957 | Bridges et al. | 242/526 |
| 3,097,557 | A | * | 7/1963 | Langstaff | 83/454 |
| 3,659,487 | A | * | 5/1972 | Henderson | 83/447 |
| 3,788,175 | A | | 1/1974 | Davis | |
| 3,890,868 | A | | 6/1975 | Pickler | |
| 4,809,921 | A | * | 3/1989 | Dueck et al. | 242/527.5 |
| 4,951,539 | A | * | 8/1990 | Buckner | 83/884 |
| 4,954,202 | A | * | 9/1990 | Price et al. | 156/353 |
| 4,999,923 | A | | 3/1991 | Gustavsen | |
| 5,046,392 | A | * | 9/1991 | Keon et al. | 83/862 |
| 5,158,525 | A | * | 10/1992 | Nikkel | 493/471 |
| 5,458,034 | A | * | 10/1995 | Cavagna | 83/488 |
| 5,480,081 | A | * | 1/1996 | Wilson et al. | 225/96.5 |
| 5,927,173 | A | * | 7/1999 | Lyons et al. | 83/650 |
| 5,931,484 | A | * | 8/1999 | Jones et al. | 280/47.24 |
| 6,422,114 | B1 | * | 7/2002 | Cunningham, Jr. | 83/435.2 |

* cited by examiner

*Primary Examiner*—Boyer D. Ashley
(74) *Attorney, Agent, or Firm*—Butler Snow et al.

(57) ABSTRACT

A device and method for simultaneously cutting and scoring pieces of insulation consisting of thick fiber on a foil backing, for joining pieces of insulation. A dolly is provided for carrying a fifty-pound roll of insulation so that insulation can be pulled from the roll and over an attached cutting surface. Two parallel rotary knives move together across the insulation on the cutting surface. One knife cuts through both the fiber and foil. The other knife simultaneously makes a parallel cut 1.5 inches from the first, through the fiber but not the foil, so that the fiber between the two cuts can be removed from the foil. The foil from which the fiber has been removed, can then be overlapped onto the foil of another piece of insulation to join the two pieces.

4 Claims, 4 Drawing Sheets

INSULATION CARRYING AND CUTTING DEVICE

FIELD OF THE INVENTION

The present invention relates generally to insulation. More specifically, the present invention pertains to methods of carrying, dispensing and cutting insulation. The present invention is particularly, though not exclusively, useful for cutting lengths from rolled sheets of insulation having insulative material on a foil backing, and scoring a portion of the insulative material for removal from the foil, using dual rotary knives.

BACKGROUND OF THE INVENTION

Insulation for insulating buildings may be supplied in sheet form consisting of a thick fibrous insulative layer (or "fiber") adherent to a thin flexible backing or substrate such as foil or paper. Such sheets of insulation may be about six feet wide, and may be supplied in cylindrical rolls weighing about fifty-pounds. Such a roll may be mounted on a dispenser such that the roll may turn freely upon its cylindrical axis, so that the insulation can be easily dispensed from the roll. The dispenser may have wheels, such as a dolly, so that the roll may be ported. The dispenser may be equipped with a cutting blade or blades for cutting pieces of insulation from the roll.

When insulating a surface, separate pieces of insulation may be joined edge to edge to cover the surface. To join pieces having foil backing, the fiber may be removed from the foil in a strip, along the edge to be joined of one piece, wide enough to allow the foil from which the fiber has been removed, to overlap the foil of the other piece and abut the fiber of the one piece with the fiber of the other piece. The width of the strip may be around 1.5 inches. The overlapping foil is then taped to the foil of the adjoining piece so that there are no gaps in the joined foil, which gaps might reduce the effectiveness of the insulation.

To remove the fiber from the foil in the strip, the fiber is cut, without cutting the foil, along the perimeter of the strip. Then the fiber is peeled from the foil. Such cutting of the fiber without cutting the foil may be referred to as "scoring" the fiber. The fiber may be scored manually or otherwise, after a piece is cut from a roll. The score is often made parallel to the cut edge. However, manual scoring may produce an uneven score, making the abutment of the fibers of the two pieces uneven. Also, manual scoring may result in a score that is too deep, in which case the foil may be cut; or a score may not be deep enough, in which case the fiber may be more difficult to remove.

While some insulation dispensers incorporate blades for cutting pieces of insulation from a roll, there has not been a device that simultaneously cuts the insulation and scores the fiber. It is an object of the present invention to provide a device that carries a roll of insulation, dispenses insulation from the roll, cuts pieces of insulation, and simultaneously scores the fiber parallel to the cut edge and at an optimal depth.

SUMMARY OF THE PRESENT INVENTION

The present invention provides a two-wheel dolly, fashioned after dollies designed to accommodate and carry 55 gallon drums, adapted to carry a fifty-pound roll of insulation. The dolly has a carriage in the shape of a cylindrical section and sized to accept a fifty-pound roll of insulation.

The dolly has wheels at one end of the carriage, and handles at the other end that double as legs for stationing the dolly for dispensing of insulation from the roll. In the bottom and sides of the carriage are rollers upon which the roll may rotate such that the insulation can be easily pulled from the roll. Alongside the carriage is a cutting plate over which the insulation can be drawn to a point to be cut and scored. Two parallel circular blades are drawn along the cutting plate. One blade cuts the insulation, and the other scores the fiber in a narrow strip along the cut edge. An advantage of this invention is that it scores the fiber simultaneously with the cutting of the piece, thus eliminating the need to score the fiber separately after cutting the piece. Another advantage is that because the blades are parallel and set at the right height, the scoring is ensured to be at the right depth, even and parallel to the cut edge.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION

Figure 1:
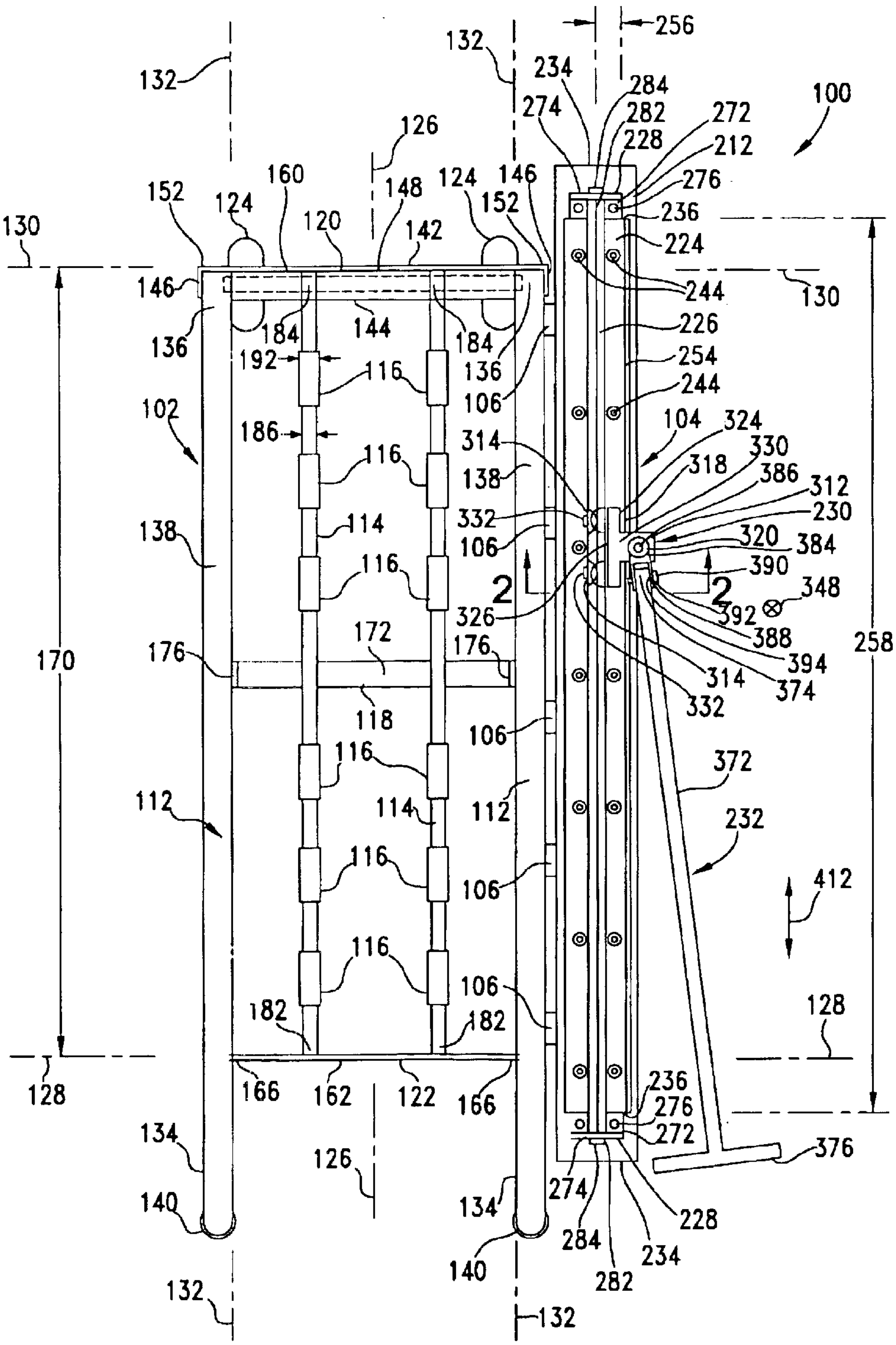
FIG. 1 is a top view of a preferred embodiment of the present invention.

Referring initially to FIG. 1, a side view of the preferred embodiment of the Insulation Carrying and Cutting Device of the present invention is shown and generally designated 100, and may be referred to herein as dolly 100. In FIG. 1, dolly 100 includes a carriage 102, a cutting assembly 104, and angle braces 106. Carriage 102 includes two elongated parallel rigid tubular members 112, two elongated parallel rigid tubular supports 114, rollers 116, a flanged rib 118, a rimmed rear plate 120, a fore plate 122, and two dolly wheels 124. Carriage 102 is shaped like a hollow cylindrical section taken along a plane parallel to the cylindrical axis, with handles and wheels attached to the cylindrical section (or, the "cylindrical section"). With respect to FIG. 1, the plane of the section would be parallel to the plane of the page. The cylindrical section has an axis of symmetry (or symmetry axis) 126 which is parallel to the axis of the cylinder from which the section is taken. Symmetry axis 126 lies in the plane of the section. The cylindrical section has a fore planar end which has a linear edge collinear with a line 128 (or, the "fore planar end"); a rear planar end which has a linear edge collinear with a line 130 (or, the "rear planar end"); a curved surface, having linear edges collinear with lines 132, 128 and 130, and which touches members 112 and rollers 116 (or, the "curved surface"); and a planar surface coplanar with the plane of the section, and having linear edges collinear with lines 132, 128 and 130 (or, the "planar surface"). With respect to the viewer of FIG. 1, the planar surface is closer to the viewer than the curved surface. The cylindrical section is sized to hold a fifty-pound roll of insulation. The cylindrical section may alternatively be sized to hold rolls of insulation greater or lesser than fifty-pounds.

Each of members 112 has a curved fore end 134, a rear end 136, and a shaft 138 parallel to symmetry axis 126. Members 112 and much of the rest of dolly 100 can be weldable metal. Alternatively, dolly 100 can be made from any other material including but not limited to other types of metals, wood, plastic, ceramic, composite, laminate, stone, cement, etc. If material other than weldable metal is used to make dolly 100, then where words such as "welded", "bolted", etc. are used in the specification to denote attachment of parts, there may be substituted words denoting modes of attachment appropriate to the material used, including but not limited to "welded", "glued", "nailed", "bolted", "bound", "bonded", "brazed", "soldered", etc. Fore end 134 of each member 112 is curved so that fore ends 134 serve the dual purposes of handles for moving dolly 100, and of legs for stationing dolly 100. For this latter purpose, feet 140 are welded to fore ends 134 for contact with the ground.

Rimmed rear plate 120 has a semi-lenticular rear plate 142, and a rim 144 extending perpendicularly from the plane of semi-lenticular rear plate 142 towards the fore planar end of the cylindrical section. Semi-lenticular rear plate 142 coincides with the rear planar end of the cylindrical section. Rim 144 coincides with a narrow strip of the curved surface connected to the rear planar end of the cylindrical section. Rim 144 has linear rim ends 146. Semi-lenticular rear plate 142 has linear edge 148, arcuate edge 150 (not visible in FIG. 1, behind semi-lenticular rear plate 142), and corners 152 collinear with rim ends 146. Linear edge 148 is collinear with line 130. The rear end 136 of each member 112 is welded to a separate corner 152 and collinear rim end 146. Rim 144 provides structural support for carriage 102, and may provide some support for the rear end of a roll of insulation in carriage 102. Semi-lenticular rear plate 142 keeps the rear end of a roll of insulation from passing through the rear planar end of the cylindrical section. Semi-lenticular rear plate 142 also supports some of the weight of the roll when curved fore ends 134 are picked up off the ground and dolly 100 is in mobile position.

Dolly wheels 124 are rotatably mounted on an axle 160 (shown in phantom line) welded to the middle of the outside of rim 144 and parallel to line 130. Dolly wheels 124 are usually in contact with the ground. Dolly wheels 124 provide support and mobility for dolly 100.

Fore plate 122 is semi-lenticular and coincides with the fore planar end of the cylindrical section. Fore plate 122 has linear edge 162, arcuate edge 164 (not visible in FIG. 1, behind fore plate 122), and corners 166. Linear edge 162 is collinear with line 128. Each corner 166 is welded to a separate member 112 near a point between curved fore end 134 and shaft 138, such that a distance 170 between rear plate 142 and fore plate 122 accommodates the length of an insulation roll. Fore plate 122 keeps the fore end of the insulation roll from passing through the fore planar end of the cylindrical section.

Flanged rib 118 has an arcuate band 172 coincident with a portion of the curved surface of the cylindrical section. Flanged rib 118 also has a semi-annular flange 174 (not visible in FIG. 1, behind flanged rib 118) extending from the rear edge of band 172, perpendicularly to the surface of band 172 and away from symmetry axis 126. Flanged rib 118 also has linear rib ends 176. Each rib end 176 is welded to a separate member 112 at about the middle of shaft 138. Each rib end 176 may be collinear with the line 128 adjacent to the member 112 to which that rib end 176 is welded. Alternatively, each rib end 176 may be non-collinear with line 128. Flanged rib 118 gives structural strength to carriage 102 and provides support for supports 114.

Each of supports 114 has a support fore end 182, a support rear end 184, and an outside diameter 186. Each support 114 is placed parallel to symmetry axis 126, with support fore end 182 welded to fore plate 122 adjacent arcuate edge 164, with support rear end 184 welded to the inside of rim 144 and/or to semi-lenticular rear plate 142 adjacent arcuate edge 150, and with its approximate middle adjacent to the inside of band 172, so that an insulation roll placed in carriage 102 doesn't pass through the curved surface of the cylindrical section. Each support 114 may be welded to the inside of band 172 where these are adjacent, for added strength and stability. Supports 114 support most of the weight of an insulation roll when dolly 100 is substantially horizontal, with dolly wheels 124 and feet 140 on or near the ground. Supports 114 also support part of the weight of the insulation roll when dolly 100 is in diagonal position with feet 140 off the ground. While FIG. 1 shows two supports 114, invention 100 may have one, three, or more supports 114. At least one support 114 is needed to keep the insulation roll from passing through the curved surface of the cylindrical section. An alternative to supports 114 is one or more other ribs like rib 118, with or without flange 174, along the length of carriage 102, to support the insulation roll.

Rollers 116 are cylinders, each of which is positioned upon a support 114. Each roller 116 has an inside diameter (not visible in FIG. 1) a little larger than the outside diameter 186 of the support 114 upon which it is positioned, and each roller 116 has an outside diameter 192 a little larger than its inside diameter, so that each roller 116 can rotate about the support 114 upon which it is positioned. Alternatively, each roller 116 may have an axle or ball bearings or other mechanism to allow it to rotate with respect to support 114. As shown in FIG. 1, six rollers are positioned upon each support 114, three on either side of flanged rib 118. Alternatively, more or fewer rollers may be placed on any support 114 on any side of flanged rib 118. Rollers 116 assist an insulation roll in rotating within carriage 102 as insulation is pulled from the roll.

Cutting assembly 104 includes an elongated base 212, a cutting plate 224, a rail 226, two angle brackets 228, a cutting head 230, and a handle 232. Base 212 has base ends 234. Cutting plate 224 has cutting plate ends 236. Cutting plate 224 may be placed mostly or all on base 212, with the length of cutting plate 224 substantially parallel to the length of base 212. Cutting plate 224 may be attached to base 212 by placing spacer plates 242 (not visible, beneath cutting plate 224 in FIG. 1) between base 212 and cutting plate 224, bolting cutting plate 224 to base 212 with countersunk bolts 244, and welding together cutting plate 224, spacer plates 242 and base 212. Cutting plate 224 may also be bolted without welding, or welded without bolting, or attached by other appropriate means, with or without spacer plates 242, to base 212. Alternatively, cutting plate 224 may be integral with base 212. Cutting plate 224 has a cutting groove 252 (not visible, beneath rail 226 in FIG. 1) and a scoring groove 254, substantially parallel to each other. In FIG. 1, cutting groove 252 and scoring groove 254 are substantially parallel to symmetry axis 126. Alternatively, cutting groove 252 and scoring groove 254 may be angular to symmetry axis 126. Cutting groove 252 and scoring groove 254 are separated from each other by a distance 256 equal to the width of fiber to be removed from the edge of a cut piece of insulation. For example, if 1.5 inches of fiber is to be removed from the cut edge, then distance 256 is 1.5 inches. Alternatively, distance 256 may be greater or less than 1.5 inches. Cutting groove 252 and scoring groove 254 have length 258. Alternatively, cutting groove 252 and scoring groove 254 may have different lengths. In FIG. 1, length 258 is greater than distance 170, so that cutting head 230 can continue past the edge of insulation being cut and scored, to facilitate cutting and scoring. Cutting and scoring are further explained below. Alternatively, if desired, length 258 may be less than or equal to distance 170.

Each angle bracket 228 has a bracket foot 272 and a bracket head 274. For each angle bracket 228, bracket foot 272 is bolted 276 to a separate base end 234. Rail 226 has rail ends 282. Each rail end 282 is bolted 284 to the bracket head 274 of a separate angle bracket 228 such that rail 226 is suspended over cutting plate 224 with the length of rail 226 substantially parallel to cutting groove 252 and to scoring groove 254 and at a distance 292 (not visible in FIG. 1) from cutting plate 224 to accommodate cutting head 230 as explained below.

Cutting head 230 has a head plate 312, rail wheels 314, a circular cutting blade 316 (not visible, beneath rail 226 in FIG. 1), a circular scoring blade 318, and a pivot 320. Head plate 312 is at least partially substantially vertically planar on two opposite sides 324 and 326. Head plate 312 has a lower end 328 (not visible, behind head plate 312 in FIG. 1) pointed towards cutting plate 224, and an upper end 330 pointed away from cutting plate 224. Side 326 is adjacent to rail 226. Head plate 312 is paraxially translatably mounted on rail 226 by means of rail wheels 314 on top and bottom of rail 226 and bolted 332 to side 326 of head plate 312. In FIG. 1, two rail wheels are on top of rail 226, and two more rail wheels (not visible in FIG. 1) are on bottom of rail 226. Alternatively, more or fewer rail wheels 314 may be on top or bottom of rail 226. With respect to FIG. 2, head plate 312 is shown at the right side of rail 226. Alternatively, head plate 312 may be mounted on any other side of rail 226.

Figure 2:
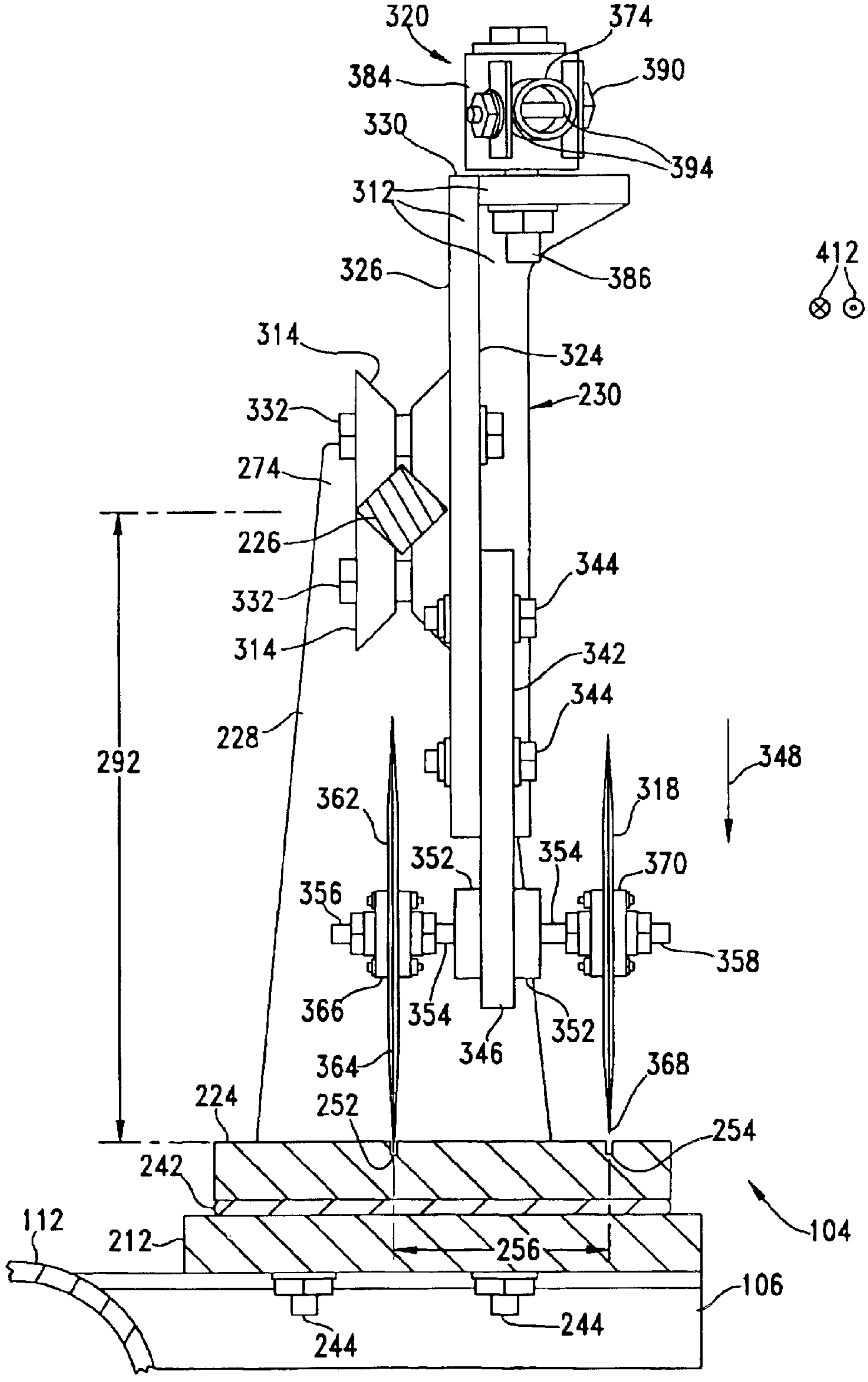
FIG. 2 is a cross-sectional view of a detail of a preferred embodiment of the present invention taken along line 2—2 of FIG. 1, and showing the cutting assembly in relation to the carriage.

Turning now to FIG. 2, a cross-sectional view of a detail of a preferred embodiment of the Insulation Carrying and Cutting Device 100 of the present invention, as taken along line 2—2 of FIG. 1, is shown. FIG. 2 shows cutting assembly 104 with relation to a member 112 of carriage 102. A strut plate 342 is bolted 344 to head plate 312, and has an extension 346 which extends beyond head plate 312 in direction 348 towards cutting plate 224. The end of extension 346 away from head plate 312 attaches to an axle housing 352 which houses an axle 354 substantially perpendicular both to scoring groove 254 and to direction 348. Axle 354 has an axle end 356 above cutting groove 252, and an axle end 358 above scoring groove 254. Cutting blade 362 has a cutting edge 364 and an axle mount 366. Cutting blade 362 is mounted on axle end 356 such that the cutting edge 364 of cutting blade 362 is received into cutting groove 252. Scoring blade 318 has a scoring edge 368 and an axle mount 370. Scoring blade 318 is mounted on axle end 358 such that scoring edge 368 is adjacent to scoring groove 254. While rail 226 is shown as angular, any part of rail 226 may alternatively be rounded. FIG. 2 also shows one of angle braces 106, which attach cutting assembly 104 to carriage 102, and are further explained below.

Returning to FIG. 1, pivot 320 has a pivot body 384, a pivot shaft 386, and connection point 388. Pivot shaft 386 has an axis about which pivot body 384 rotates. Pivot shaft 386 is bolted to upper end 330 of head plate 312 such that the axis of pivot shaft 386 is parallel to direction 348 (into the page of FIG. 1). Handle 232 has handle shaft 372, handle end 374, and grip 376. Handle end 374 is connected to connection point 388 such that handle 232 can pivot about connection point 388 through a plane that contains connection point 388 and is perpendicular to direction 348. Handle end 374 can alternatively be connected to connection point 388 such that handle 232 can pivot about connection point 388 through any other plane containing connection point 388. Handle end 374 can be connected to connection point 388 by, for example, a bolt 390 through connection point holes 392 located in connection point 388 and through handle end holes 394 located in handle end 374. Alternatives for connecting handle end 374 to connection point 388 include but are not limited to, receiving protrusions in handle end 374 through holes in connection point 388, receiving protrusions in connection point 388 through holes in handle end 374, etc. Handle 232 also pivots about pivot 320 with the rotation of pivot 320. (FIG. 2 shows a detail of how handle end 374 may be connected to pivot 320, by bolt 390 through connection point holes 392 (not visible in FIG. 2) and handle-end holes 394.)

In FIG. 1, cutting assembly 104 is placed near carriage 102 so that a sheet of insulation can be conveniently pulled from a roll of insulation in carriage 102, through the space between cutting plate 224 and rail 226, to a length to be cut and scored. Cutting assembly 104 is held in place by angle braces 106 welded to the underside of base 212 and to member 112 at line 132. Alternatively, angle braces 106 may be directly or indirectly connected to any other part of cutting assembly 104, or any other part of carriage 102. As yet another alternative, cutting assembly 104 may be directly attached to carriage 102 with or without angle braces 106.

As shown in FIG. 1, cutting head 230 can be translated along rail 226 by pushing or pulling on handle 232 in a direction 412. As cutting head 230 moves, cutting edge 364 of cutting blade 362 rolls along cutting groove 252, and scoring edge 368 of scoring blade 318 moves over scoring groove 254. If insulation having fiber and foil is placed on cutting groove 252, and cutting head 230 moves over that place, then the fiber and foil are cut there by the motion of cutting edge 364. If insulation is on scoring groove 254, and cutting head 230 moves over that point, then the fiber is cut (scored) there by the movement of scoring edge 368, but the foil there is not cut. This allows the fiber between the score and the cut edge to be removed more easily from the foil.

To cut and score a piece of insulation, cutting head 230 is first moved to one of rail ends 282. A roll of insulation having an outer end is placed in carriage 102 such that the outer end of the roll can be pulled from the underside of the roll at line 132, through the space between cutting plate 224 and rail 226, until a desired length of insulation has been pulled past cutting groove 252. The length may be measured from the outer end of the roll to cutting groove 252. Then, cutting head 230 is pulled or pushed, via handle 232, from the one rail end 282 to the other rail end 282. In the process, the insulation is cut at cutting groove 252 by cutting blade 362, and a strip of fiber along the cut edge of the cut piece is scored at scoring groove 254 by scoring blade 318 for removal of the scored fiber from the foil backing.

Figure 3:
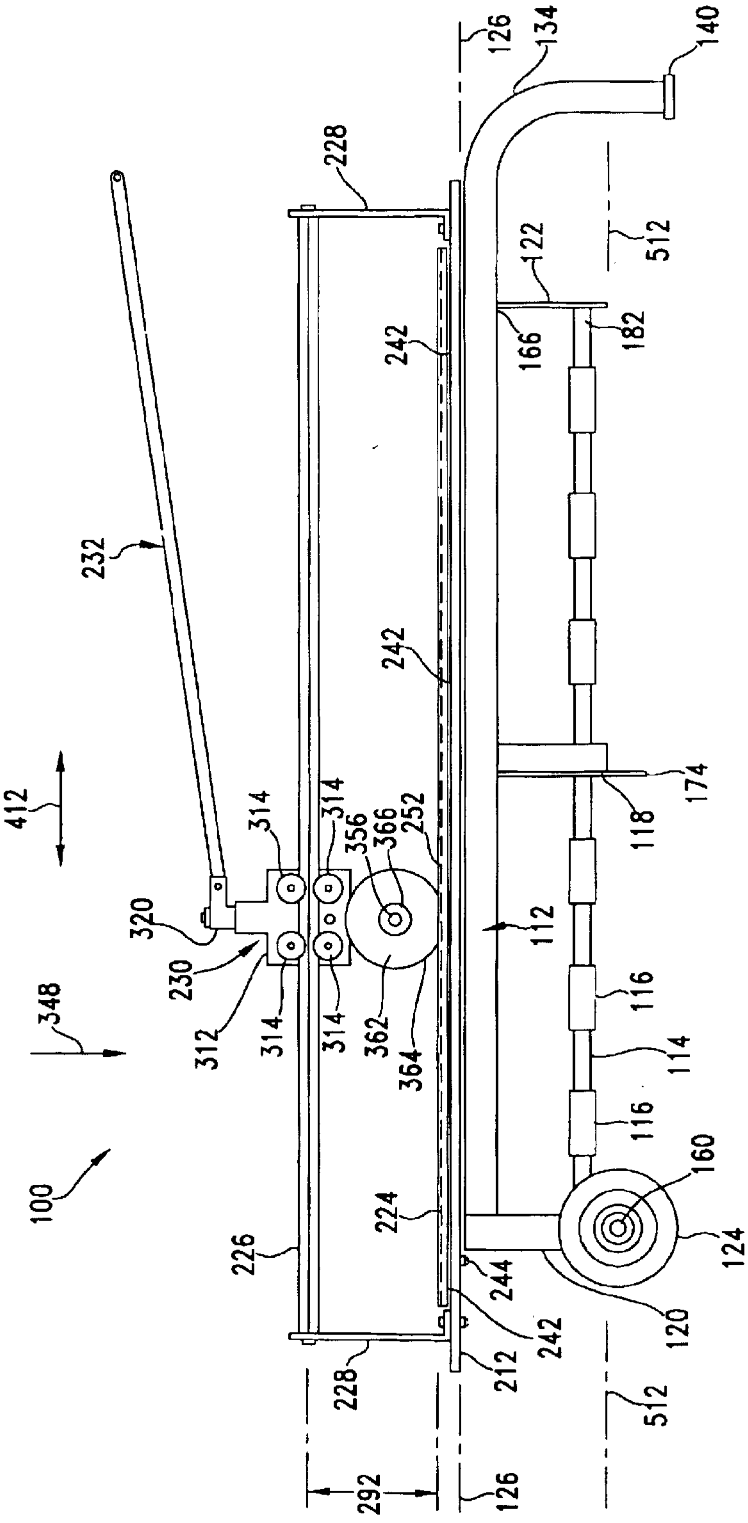
FIG. 3 is a side view of a preferred embodiment of the present invention.

Proceeding now to FIG. 3, a side view of a preferred embodiment of the Insulation Carrying and Cutting Device 100 of the present invention is shown. Line 512 is collinear with the part of the curved surface of the cylindrical section, farthest from symmetry axis 126. FIG. 3 shows the curve of curved fore end 134 of members 112, flange 174 of flanged rib 118, spacer plates 242 between base 212 and cutting plate 224, distance 292 between rail 226 and cutting plate 224, rail wheels 314 on top and bottom of rail 226, and cutting blade 362 mounted on axle end 356 with cutting edge 364 in cutting groove 252 (shown in phantom line in FIG. 3).

Figure 4:
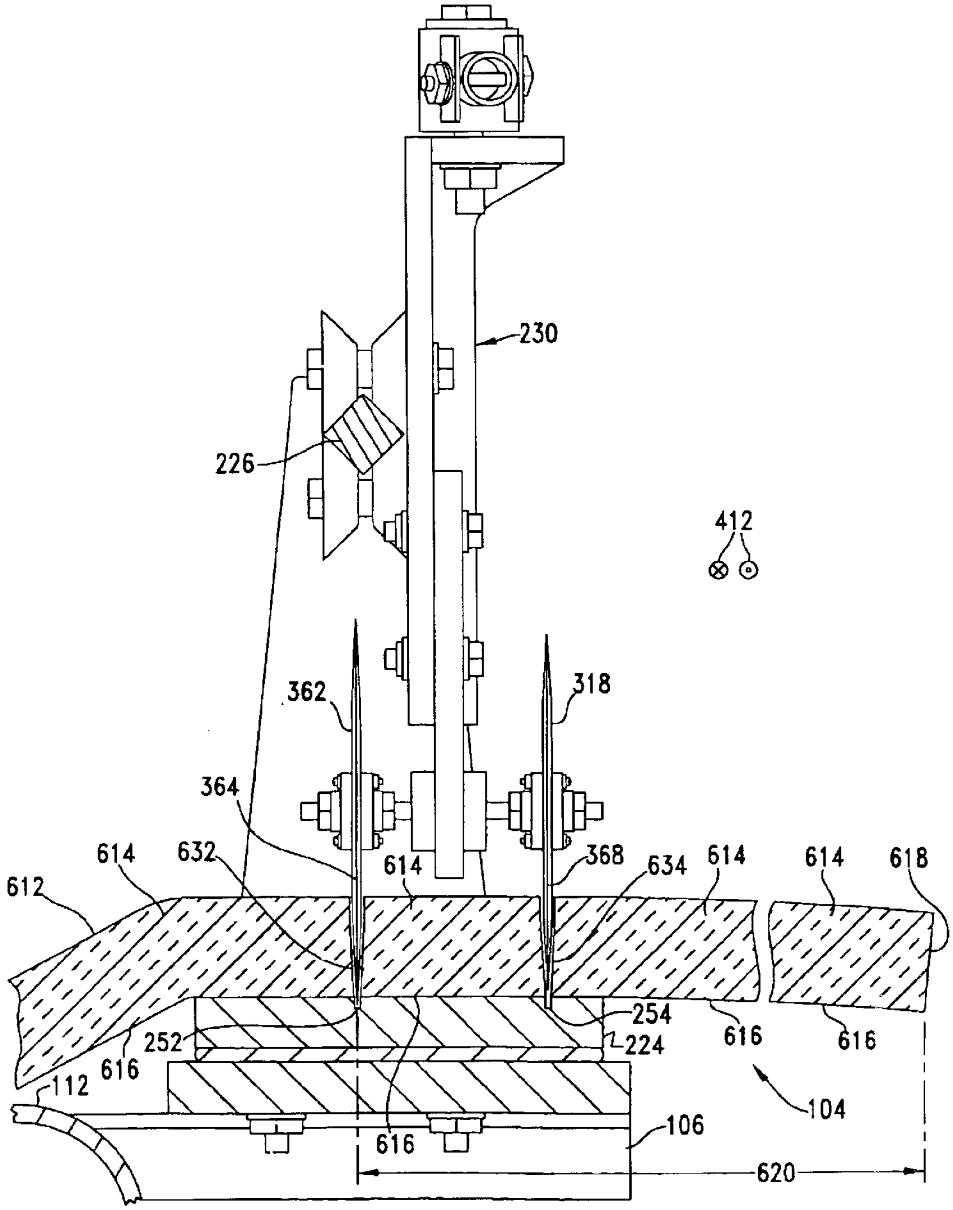
FIG. 4 is a cross-sectional view of a detail of a preferred embodiment of the present invention taken along line 2—2 of FIG. 1, similar to FIG. 2 except that FIG. 4 shows the cutting assembly in relation to insulation being cut and scored by the blades.

FIG. 4 is a cross-sectional view of a detail of a preferred embodiment of the Insulation Carrying and Cutting Device 100 of the present invention, similar to FIG. 2, except that FIG. 4 shows cutting assembly 104 in relation to insulation 612 being cut and scored. Insulation 612 has fiber 614, foil 616, and outer end 618. Outer end 618 is the outer end of a roll (not visible, to left of FIG. 4) of insulation 612 in carriage 102. Outer end 618 has been pulled from the roll, through the space between cutting plate 224 and rail 226, until a desired length 620 of insulation 612 has been pulled past cutting groove 252 on cutting plate 224. Cutting head 230 is moved in direction 412 (into or out of the page of FIG. 4) across insulation 612. Cutting edge 364 of cutting blade 362 cuts 632 both the fiber 614 and foil 616 of insulation 612, at cutting groove 252. At the same time, scoring edge 368 of scoring blade 318 cuts (scores) 634 fiber 614, but not foil 616, at scoring groove 254, so that fiber 614 between cut 632 and score 634 can be removed from foil 616.

While the present invention has been described in conjunction with cutting and scoring of insulation, the present invention can also be adapted and used with other types of materials to be cut and scored, including but not limited to foam padding with a backing, etc.

While the methods and apparatus for the Insulation Carrying and Cutting Device of the present invention as herein shown and disclosed in detail is fully capable of obtaining the objects and providing the advantages herein before stated, it is to be understood that it is merely illustrative of preferred embodiments of the invention and that no limitations are intended to the details of the method, construction or design herein shown other than as described in the appended claims.

We claim:

1. A device for carrying, cutting and scoring rolled insulation having a thick fibrous layer adherent to a thin flexible substrate, comprising:

a dolly comprising two handles and a carriage, wherein said handles also function as feet when lowered to the ground, wherein said carriage receives rolled insulation, wherein insulation issues from said rolled insulation in said carriage;

a cutting groove, substantially linear, having length greater than or equal to the width of said insulation, and spatially fixed relative to said carriage, wherein a first portion of said insulation is placed adjacent to said cutting groove;

a scoring groove, substantially parallel to and substantially the same length said cutting groove, wherein a second portion of said insulation is placed adjacent to said scoring groove;

a rotary circular blade having a cutting edge, wherein said cutting edge is received into said cutting groove, wherein said cutting blade is translated substantially parallel to said cutting groove, wherein said first portion of said insulation is cut; and a rotary circular scoring blade having a scoring edge, wherein said scoring edge is adjacent to said scoring groove, wherein said scoring blade is translated substantially parallel to said scoring groove, wherein said fibrous layer of said second portion is cut without cutting said substrate of said second portion, at the same time as said cutting of said first portion by said cutting blade.

2. The device of claim 1, wherein the distance between said scoring groove and said cutting groove is one-and-a-half (1.5) inches.

3. The device of claim 1, wherein the distance between said scoring groove and said cutting groove is in the range from zero (0) to ten (10) inches.

4. The device of claim 1, wherein the distance between said scoring groove and said cutting groove is in the range from zero (0) to one-hundred (100) inches.

* * * * *

UNITED STATES PATENT AND TRADEMARK OFFICE

CERTIFICATE OF CORRECTION

PATENT NO. : 6,813,985 B2

DATED : November 9, 2004

INVENTOR(S) : Thomas Gharst and Jerry Cheek

It is certified that error appears in the above-identified patent and that said Letters Patent is hereby corrected as shown below:

Column 8,

Line 12, should read -- tially the same length as said cutting groove, wherein a --

Signed and Sealed this

Fifteenth Day of February, 2005

JON W. DUDAS

*Director of the United States Patent and Trademark Office*